(12) United States Patent
Shiomi

(10) Patent No.: US 7,956,921 B2
(45) Date of Patent: Jun. 7, 2011

(54) IMAGING APPARATUS INCLUDING A SEPARABLE MONITOR AND CAPABLE OF WIRELESS COMMUNICATION, AND METHOD FOR CONTROLLING THE IMAGING APPARATUS

(75) Inventor: Yasuhiko Shiomi, Itabashi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 11/745,305

(22) Filed: May 7, 2007

(65) Prior Publication Data
US 2007/0268382 A1 Nov. 22, 2007

(30) Foreign Application Priority Data

May 16, 2006 (JP) ................................. 2006-136419

(51) Int. Cl.
*H04N 5/222* (2006.01)
*H04N 5/76* (2006.01)
(52) U.S. Cl. ............. 348/333.01; 348/231.7; 348/231.9; 348/375
(58) Field of Classification Search ............. 348/333.07, 348/231.7, 231.9
See application file for complete search history.

(56) References Cited

U.S. PATENT DOCUMENTS

| 4,887,161 | A | * | 12/1989 | Watanabe et al. | 348/231.7 |
| 5,648,816 | A | * | 7/1997 | Wakui | 348/231.9 |
| 6,052,509 | A | | 4/2000 | Abe | |
| 6,738,090 | B2 | * | 5/2004 | No et al. | 348/207.11 |
| 6,747,689 | B1 | * | 6/2004 | No et al. | 348/207.2 |
| 6,856,353 | B1 | * | 2/2005 | Misawa | 348/333.07 |
| 7,548,266 | B1 | * | 6/2009 | Lehrman | 348/333.11 |
| 7,619,657 | B2 | * | 11/2009 | Watanabe et al. | 348/211.2 |

FOREIGN PATENT DOCUMENTS

| JP | 9261519 A | 10/1997 |
| JP | 2004088396 A | 3/2004 |
| JP | 2004187127 A | 7/2004 |
| JP | 8205106 A | 8/2006 |

\* cited by examiner

*Primary Examiner* — Ngoc-Yen T Vu
(74) *Attorney, Agent, or Firm* — Canon USA Inc IP Division

(57) ABSTRACT

An imaging apparatus includes a first part and a second part separable from each other. If the first part and the second part are in a united state, the imaging apparatus stores image data into a storage medium of the first part or a storage medium of the second part. If the first part and the second part are in a separated state, the imaging apparatus stores image data into a storage medium of the first part and transmits the image data stored in its storage medium to the second part.

11 Claims, 16 Drawing Sheets

RELATED ART

IMAGING APPARATUS INCLUDING A SEPARABLE MONITOR AND CAPABLE OF WIRELESS COMMUNICATION, AND METHOD FOR CONTROLLING THE IMAGING APPARATUS

BACKGROUND OF THE INVENTION

1. Field of the Invention

The present invention relates to an imaging apparatus, such as a digital camera, which can transfer an image with a wireless communication unit.

2. Description of the Related Art

More specifically, the present invention relates to a camera system that includes a camera body part controlling actual shooting processing, and a monitor display part separable from the camera body part that controls the display of a captured image.

An image captured by a digital camera can be directly transmitted to other devices via a wireless local area network (LAN) or other wireless communication medium.

FIG. 16 illustrates an internal system arrangement of a conventional camera 101. The camera 101 includes a battery 114 and a power control circuit 115 that controls power supply to various units in the camera.

When a user pushes a release button on the camera 101, a camera control unit 102 detects a change of a camera switch (SW) 103 and starts a camera shooting control.

An image sensor 104 captures an image of an object and sends a captured image to a processor 105. The processor 105 temporarily stores the captured image into a buffer memory 107. The processor 105 can successively read images from the buffer memory 107 and apply predetermined image processing (e.g., matrix processing, γ conversion, and JPEG conversion) to each read image. The processor 105 can write a processed image to a nonvolatile memory 106 in the camera or send the processed image to a memory card 109 via an external card interface (I/F) 108.

A monitor unit (e.g., a TFT liquid crystal screen) 113, provided on a back surface of the camera, enables a user to confirm a captured image. When a user operates a monitor SW 112 on the side of the monitor unit 113, the monitor unit 113 displays various screens so that the user can view an intended image on the screen or can set various parameters of the camera (including the size/mode of a shooting image and developing parameters) on a menu screen.

The image data having been subjected to the image processing can be transferred via a wireless communication unit 110 (e.g., a wireless LAN) to an external network or to a personal computer (PC). In this case, the processor 105 reads an image from the nonvolatile memory 106 of the camera or from the memory card 109. Then, the processor 105 applies various communication protocol processing (i.e., processing required for transferring image data to a network system) to the read image and transfers the processed image to an external PC 116 via the wireless communication unit 110 and an antenna 111.

The wireless communication unit 110 includes a media access control (MAC) unit that can control a communication procedure in a media access control layer (MAC layer) at a network protocol level and a physical layer (PHY) unit that can actually modulate and convert the data into a signal having a predetermined frequency band. For example, according to the standard of a general wireless LAN, the converted signal is a 2.4 GHz band signal for 802.11b/g or a 5 GHz band signal for 802.11a.

There is a conventional camera including a camera body unit and a monitor unit that are separable from each other and can transmit/receive a captured image or a playback image via a wireless communication medium.

For example, as discussed in Japanese Patent Application Laid-Open No. 8-205016, a video camera body can transmit a captured image via a wireless communication medium to a remote monitor unit and the remote monitor unit can display a received image. If a user operates the monitor unit, the monitor unit performs a remote control for operating the video camera body via the wireless communication.

Furthermore, as discussed in Japanese Patent Application Laid-Open No. 9-261519, an imaging unit of a video camera is separable from a recording unit including a monitor unit that displays a captured image. The imaging unit can transmit a captured image to the recording unit via a wireless communication medium. The recording unit includes a predetermined storage medium (e.g., a magnetic tape) that stores the images transmitted from the imaging unit.

Furthermore, as discussed in Japanese Patent Application Laid-Open No. 2004-088396, a digital camera includes an imaging unit separable from a camera body unit including a monitor unit that displays a captured image. When a user performs a release operation on the camera body unit, the imaging unit can start a shooting control.

More specifically, the camera body unit detects a user's pressing operation on a release button and transmits a detection signal to the imaging unit via a wireless communication medium. In response to the detection signal, the imaging unit performs a shooting control and transmits captured image data to the camera body unit via the wireless communication medium. The camera body unit stores the received image data into a memory card attached to the camera body.

Furthermore, as discussed in Japanese Patent Application Laid-Open No. 2004-187127, a camera can include an imaging unit separable from a camera body unit that applies image processing to image data captured by the imaging unit. The imaging unit includes a built-in memory for temporarily storing image data. The camera body unit has a memory card.

According to the camera having the above-described arrangement, the imaging unit temporarily stores the captured image data into the built-in memory if a user separates the imaging unit from the camera body unit.

As discussed in the above-described prior art, even when a camera includes a body unit and a monitor unit which are separable from each other, the body unit and the monitor unit can perform operations independently if the camera includes a processor in the body unit and another processor in the monitor unit.

On the other hand, the camera can flexibly use two processors in a condition where a user unites (or integrates) the body unit with the monitor unit. Thus, it is desirable to effectively use two processors for processing the image data.

SUMMARY OF THE INVENTION

Exemplary embodiments of the present invention are directed to an imaging apparatus capable of effectively processing image data with a wireless communication medium.

According to an aspect of the present invention, an imaging apparatus that has a first part including a capturing unit capable of capturing an image and a second part separable from the first part. The imaging apparatus includes a transmission control unit configured to control transmission of image data from the first part to the second part. The imaging apparatus, if the image capturing is performed by the capturing unit in a united state, stores image data of the captured image in a nonvolatile storage medium of the first part and a nonvolatile storage medium of the second part, and if the image capturing is performed by the capturing unit in a separated state, stores image data of the captured image in the storage medium of the first part and transmits the image data to the second part.

According to another aspect of the present invention, a method for controlling an imaging apparatus that has a first part capable of capturing an image and a second part separable from the first part. The method includes transmitting of the image data from the first part to the second part, if the image capturing is performed in a united state, storing image data of the captured image in a nonvolatile storage medium of the first part and a nonvolatile storage medium of the second part, and if the image capturing is performed in a separated state, storing image data of the captured image in the storage medium of the first part and transmits the image data to the second part.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
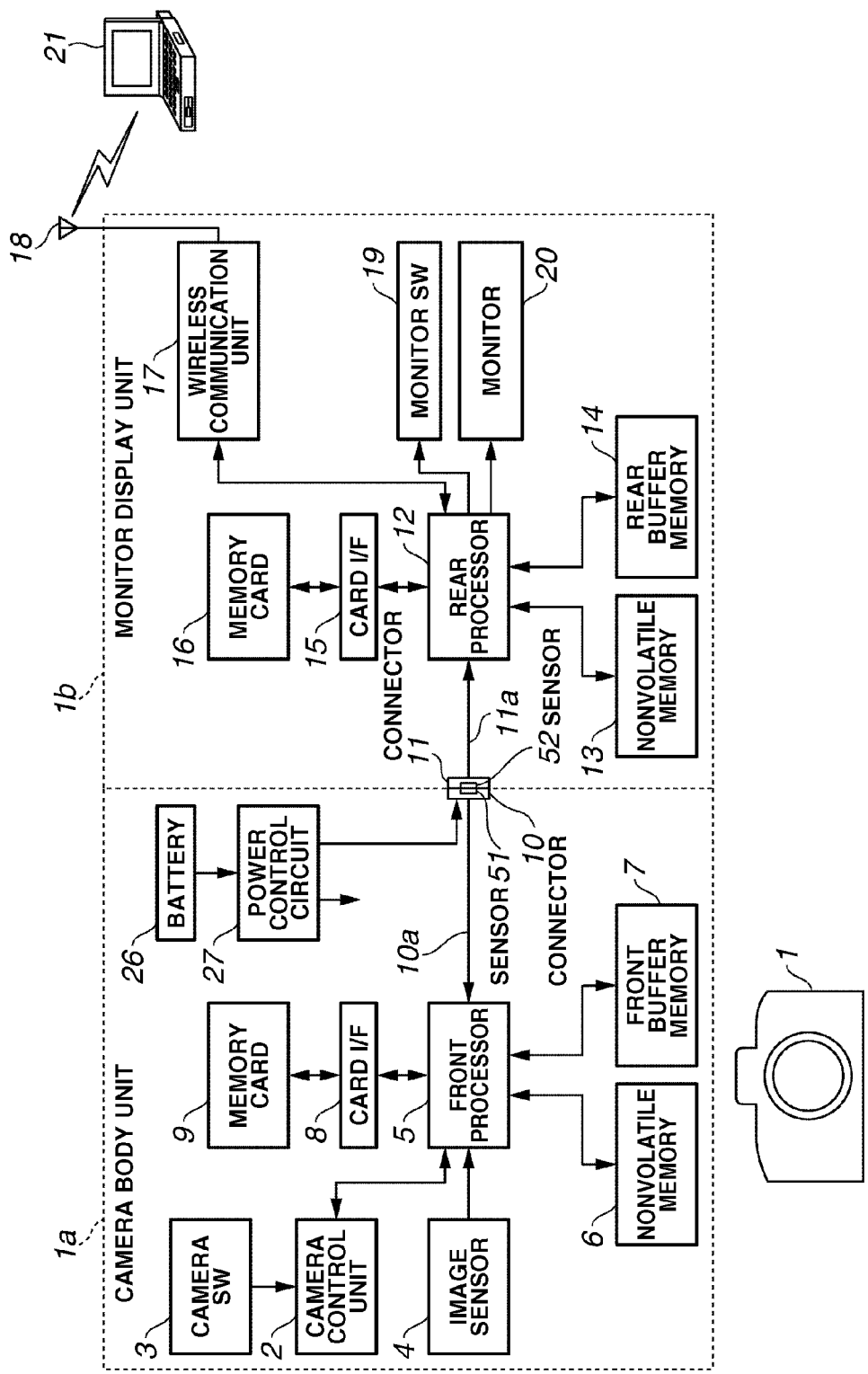
FIG. 1 is a block diagram illustrating a camera system according to a first exemplary embodiment of the present invention.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described in one figure, it may not be discussed for following figures.

Exemplary embodiments will be described in detail below with reference to the drawings.

FIG. 1 is a block diagram illustrating a camera system according to a first exemplary embodiment of the present invention, in a condition where a user unites (integrates) a camera body part with a monitor display part.

As illustrated in FIG. 1, a camera 1 includes two separable units, i.e., a camera body part 1a and a monitor display part 1b, connected via connectors 10 and 11 dedicated to respective units. The camera body part 1a and the monitor display part 1b can perform transmission/reception of various data via signal lines 10a and 11a dedicated to respective units.

The camera body part 1a includes fundamental blocks of the camera that perform a shooting control of the camera. A battery 26 is a power source capable of supplying electric power to various portions in the camera. A power control circuit 27 controls electric power supplied from the battery 26.

A camera control unit 2 is a central processing unit (CPU) capable of controlling shooting processing of the camera. In general, the camera control unit 2 performs an exposure control, an auto focus (AF) control, and a sequence control for the camera in response to a release operation or the like by a user.

A camera switch 3 includes a release button that enables a user to start a shooting operation and various settings switches (including an exposure mode switch and an AF mode switch) of the camera. The camera SW 3 can detect a change of each switch when a user operates the switch and transmit a detection signal to the camera control unit 2.

An image sensor 4 can capture an image of an object and convert the captured image into a predetermined image signal. The image sensor 4 performs an image pick-up operation in synchronism with the shutter control timing of the camera according to a predetermined shooting sequence of the camera control unit 2 and successively outputs captured image data.

A front processor 5 applies predetermined processing to an input signal and outputs a processed signal. The front processor 5 includes an analog processing unit capable of converting an analog output signal of the image sensor 4 into digital data and a digital processing unit capable of applying various processing to the digital data of a captured image.

Thus, the front processor 5 can successively input an image captured by the image sensor 4 and convert the captured image into digital data in synchronism with a shooting control of the camera.

The front processor 5 performs predetermined processing for converting an analog signal into a digital signal, processing for correcting a deteriorated digital signal caused by various imaging optical system, processing for correcting inherent deterioration of a digital signal caused by the image sensor, and other various image processing required for picture formation.

The front processor 5 performs various image processing for the picture formation. First, the front processor 5 performs color interpolation processing including conversion of the data into three (i.e., RGB) planes when the pixel array of a sensor is a Bayer array. Next, the front processor 5 performs RGB_RGB conversion processing including a matrix correction for outputting a desired color from spectral characteristics of a color filter unique to a sensor.

Furthermore, the front processor 5 inputs the data into a γ conversion block that performs a γ conversion for converting 12-bit digital data, obtainable from an ordinary analog processing unit, into 8-bit data and obtaining conversion data in a predetermined dynamic range.

Subsequently, the front processor 5 inputs the data into an RGB_YCrCb conversion block that performs RGB_YCrCb color conversion processing. Then, the front processor 5 inputs the data into a false color removal block that applies false color removal processing to the CrCb components. For example, the front processor 5 can use a median filter (i.e., intermediate value filter) or other type of filter to remove color moiré generated based on a relationship between a sampling frequency and an image frequency.

The front processor 5 successively performs the above-described sequential image processing (i.e., development processing) and temporarily stores the processed data into a front buffer memory 7.

The front buffer memory 7 is a memory unit capable of speedily performing a writing operation for a signal supplied from the front processor 5 and capable of temporarily storing the written data. For example, the front buffer memory 7 is a dynamic random access memory (DRAM) or a comparable mass-storage volatile memory.

After the storage of data into the front buffer memory 7 is accomplished, the front processor 5 can perform image processing for reducing the size of an image to a predetermined size (i.e., compression processing). In general, the compression processing is discrete cosine transform (DCT)-based JPEG compression processing (categorized to the lossy type) or Lossless compression processing (categorized to the lossless type).

When the compression processing is a lossy type JPEG compression, the front processor 5 reads the development-processed data from the front buffer memory 7. Then, the front processor 5 inputs the read data into a raster block conversion block that can convert the image data into a two-dimensional block data consisting of 8 pixels in the horizontal direction and 8 pixels in the vertical direction.

Next, the front processor 5 inputs the data into a DCT conversion block that performs a DCT conversion for converting the 8×8 block data into 8×8 frequency component data to calculate coefficients for respective two-dimensional blocks from a low-frequency component to a high-frequency component.

Next, the front processor 5 inputs the data into a quantization block that performs quantization processing for a coefficient value resulting from the above-described DCT conversion processing. In the quantization processing, the front processor 5 can use a quantization table that includes set values determined beforehand to obtain a division value for each coefficient.

Furthermore, the front processor 5 reads the data resulting from the quantization along a predetermined scanning direction and inputs the read data into a Huffman encoding block that executes entropy encoding processing based on a Huffman table including set values determined beforehand.

The front processor 5 writes the data compressed according to the above-described method into a predetermined area of the front buffer memory 7 and terminates the sequential compression processing.

On the other hand, an exemplary lossless type compression method is differential pulse code modulation (DPCM)-based compression processing. First, in the compression processing, the front processor 5 reads development-processed data from the front buffer memory 7. Then, the front processor 5 inputs the read data into a DPCM conversion block that converts the image data into differential data representing a difference between the data and a predicted value.

Next, the front processor 5 reads the DPCM-converted data and inputs the read data into the Huffman encoding block that executes entropy encoding processing based on a Huffman table including set values determined beforehand.

The front processor 5 writes the data compressed according to the above-described method into another predetermined area of the front buffer memory 7 and terminates the sequential compression processing.

Moreover, the front processor 5 is connected to a nonvolatile memory 6 functioning as another memory independent from the front buffer memory 7. The nonvolatile memory 6 can store software program that enables the front processor 5 to execute predetermined processing. Furthermore, the nonvolatile memory 6 can store the development-processed or compressed image data. For example, the nonvolatile memory 6 is a flash memory having a predetermined capacity in the range from several megabytes to several tens of megabytes.

The camera body part 1a includes a card interface (I/F) 8 to which an external card can be connected. The camera body part 1a can access an external card via the card I/F 8 to enhance the function of the camera.

A memory card 9 can be connected via the card I/F 8 to the camera body part 1a. The memory card 9 has a mass storage capacity capable of storing a great amount of image data.

As described above, the front processor 5 can apply predetermined development processing and compression processing to the image data captured by the image sensor 4. The following description refers to the above-described processing applied to image data, including the development processing, the compression processing, or the display color processing, as image processing.

The front processor 5 performs file processing for converting the finalized image data into a predetermined file and stores the file into the nonvolatile memory 6 or into the memory card 9.

The monitor display part 1*b* has the following arrangement.

A rear processor 12 is similar in arrangement to the front processor 5. The rear processor 12 can apply various processing to image data.

The monitor display part 1*b* includes processing blocks for displaying processed image data on an external TFT monitor and transferring the image data to a PC.

Figure 3:
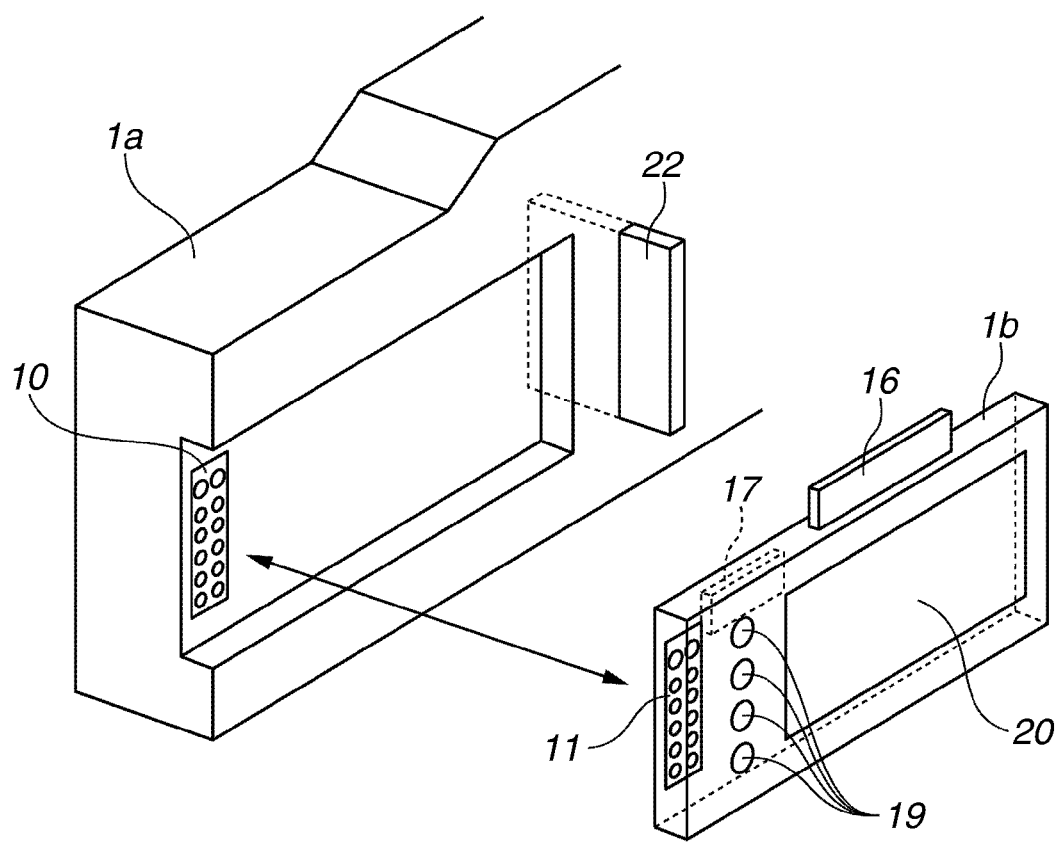
FIG. 3 is a perspective view illustrating the camera body part and the monitor display part separated from each other in the camera system according to the first exemplary embodiment.

The camera body part 1*a* and the monitor display part 1*b* are electrically connected via the connectors 10 and 11 as illustrated in FIG. 3. More specifically, the signal line 10*a* of the camera body part 1*a* is connectable to the signal line 11*a* of the monitor display part 1*b*, when a user connects or couples the connectors 10 and 11.

The connector 10 includes a sensor 51 capable of detecting an electrical connection state of the signal lines. Similarly, the connector 11 includes a sensor 52 capable of detecting an electrical connection state of the signal lines. The front processor 5 and the rear processor 12 can determine whether the camera 1 is in a united state or in a separated state based on detection signals of the sensors 51 and 52. In the present embodiment, the sensors 51 and 52 can be mechanical switches.

The signal lines according to the present embodiment include power source lines capable of supplying electric power from the battery 26 to the monitor display part 1*b* via the power control circuit 27. Furthermore, the signal lines include bus signal lines capable of transmitting/receiving data between the front processor 5 of the camera body part 1*a* and the rear processor 12 of the monitor display part 1*b*.

In general, the bus signal lines are general parallel bus signal lines including plural address buses and data buses or high-speed serial bus signal lines usable for IEEE1394 or USB.

The rear processor 12 can transmit and receive image data to and from the front processor 5 via the signal lines 10*a* and 11*a*. More specifically, the front processor 5 can transfer the image data stored in the camera body part 1*a* to a rear buffer memory 14 connected to the rear processor 12. The rear buffer memory 14 can temporarily store the received data.

The data stored in the rear buffer memory 14 includes the image data temporarily stored in the front buffer memory 7 and the image data stored in the nonvolatile memory 6 or in the memory card 9. The camera body part 1*a* can transfer image data, at any stage of the image processing, to the monitor display part 1*b*.

The rear buffer memory 14 is a memory unit capable of speedily performing a writing operation for a signal received from the rear processor 12 and temporarily storing the written data. For example, the rear buffer memory 14 is a dynamic random access memory (DRAM) or a comparable mass-storage volatile memory.

Similar to the front processor 5, the rear processor 12 is connected to a nonvolatile memory 13. The nonvolatile memory 13 can store software program that enables the rear processor 12 to execute predetermined processing. Furthermore, the nonvolatile memory 13 can store the development-processed or compressed image data. For example, the non-volatile memory 13 is a flash memory having a predetermined capacity in the range from several megabytes to several tens of megabytes.

Similar to the front processor 5, the rear processor 12 is connected to a card I/F 15. The rear processor 12 can access a memory card 16 via the card I/F 15 to store image data into the memory card 16.

The rear processor 12 performs processing for managing a file of image data to be stored in the memory card 16. The rear processor 12 can copy the image data from the memory card 9 of the camera body part 1*a* to the memory card 16 without applying any image processing to the image data. In this case, the rear processor 12 performs the file management only.

Furthermore, as illustrated in FIG. 3, the monitor display part 1*b* includes a monitor 20 that can display a captured image.

The monitor 20 is connected to the rear processor 12 via a predetermined driver circuit (provided in the monitor 20). The rear processor 12 sends a control signal to the monitor 20 to control the display on the monitor 20.

Generally, the monitor 20 includes a liquid crystal panel operable based on the TFT technology. The monitor 20 includes a backlight (not illustrated) capable of displaying captured image data. Furthermore, the monitor 20 can display various graphical user interfaces (GUI) that enable a user to set various parameters for the camera with monitor SW 19 provided along a monitor screen.

When a user operates the monitor SW 19, the rear processor 12 can display image data on the monitor 20.

First, the rear processor 12 reads the image data from the memory card 16 and applies predetermined expansion processing to the read image data if the image data is compression data. Next, the rear processor 12 performs resize processing for adjusting the read image data to have a size matching a display size of the monitor 20.

The rear processor 12 temporarily stores the resized image data, as another image data, into a predetermined area of the rear buffer memory 14. A display controller in the rear processor 12 periodically receives the temporarily stored image data from the rear buffer memory 14 and displays the received image data on the monitor 20.

The rear processor 12 can transfer the image data to an external personal computer (PC) 21 via a wireless communication medium in the following manner.

In the data transfer processing, the rear processor 12 performs network protocol processing (such as TCP/IP conversion processing). Then, the rear processor 12 converts the data into a radio signal having a predetermined frequency band and transfers the radio signal via a wireless communication unit 17 and an antenna 18 to the external PC 21.

Figure 5:
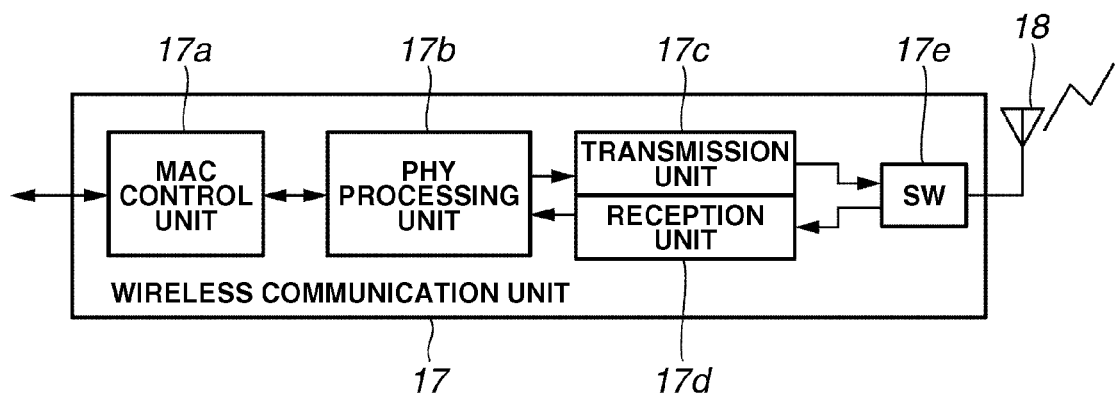
FIG. 5 is a block diagram illustrating an internal arrangement of a wireless communication unit provided in the camera body part or the monitor display part of the camera system according to the first exemplary embodiment.

As illustrated in FIG. 5, the wireless communication unit 17 includes a MAC control unit 17*a*, a PHY processing unit 17*b*, a transmission unit 17*c*, a reception unit 17*d*, and an antenna switch 17*e*. The MAC control unit 17*a* executes access control processing for determining the timing of data transmission/reception to/from other wireless device.

The PHY processing unit 17*b* performs a primary modulation (e.g., orthogonal frequency division multiplexing (OFDM) modulation used for IEEE802.11a or IEEE802.11g). Thus, the PHY processing unit 17*b* can obtain an optimum signal-to-nose ratio (S/N) for the transmission of digital data (including the captured image data or command data transmitted from a host device). Furthermore, the PHY processing unit 17*b* converts the digital data into a high-frequency signal having a predetermined wireless frequency band.

The transmission unit 17*c* is a power amplifier capable of outputting an actual transmission signal based on a signal converted by the PHY processing unit 17*b*. The reception unit 17*d* is a low-noise amplifier having higher sensitivity in the reception of an external wireless signal. The antenna switch 17e is a switch capable of selectively supplying a transmission signal to the antenna 18 and receiving a reception signal from the antenna 18. The antenna 18, connected to the antenna switch 17e, is capable of transmitting a wireless signal and receiving a wireless signal.

Figure 15:
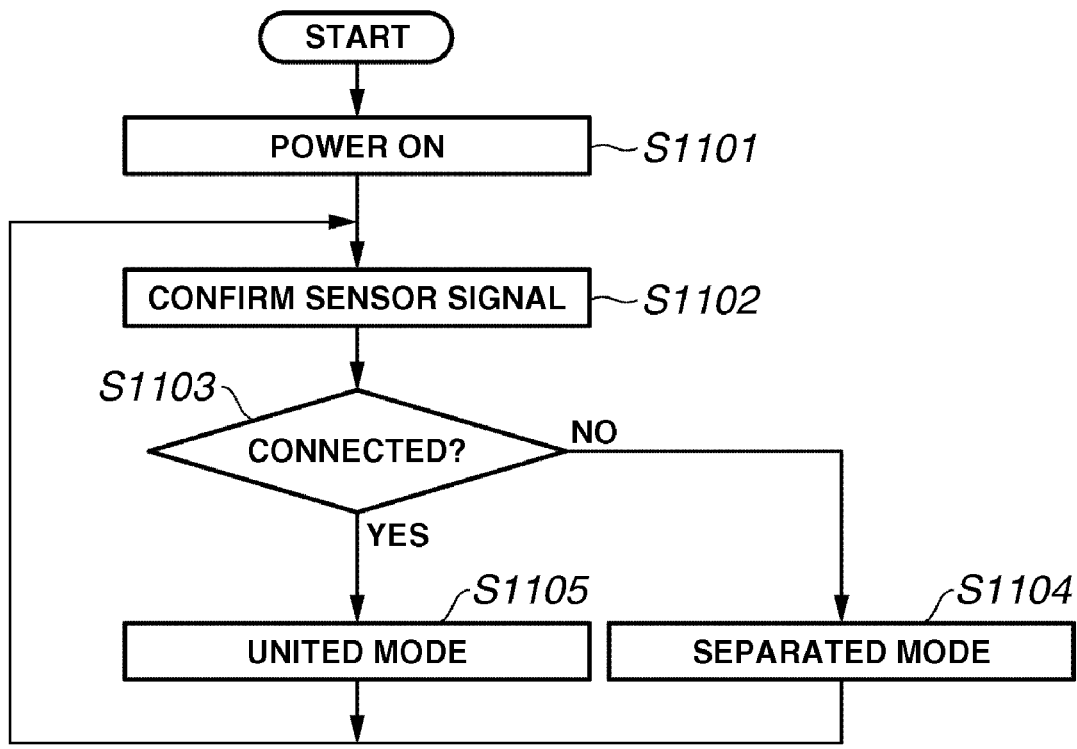
FIG. 15 is a flowchart illustrating mode switch processing performed in the camera system according to the first exemplary embodiment.
Figure 16:
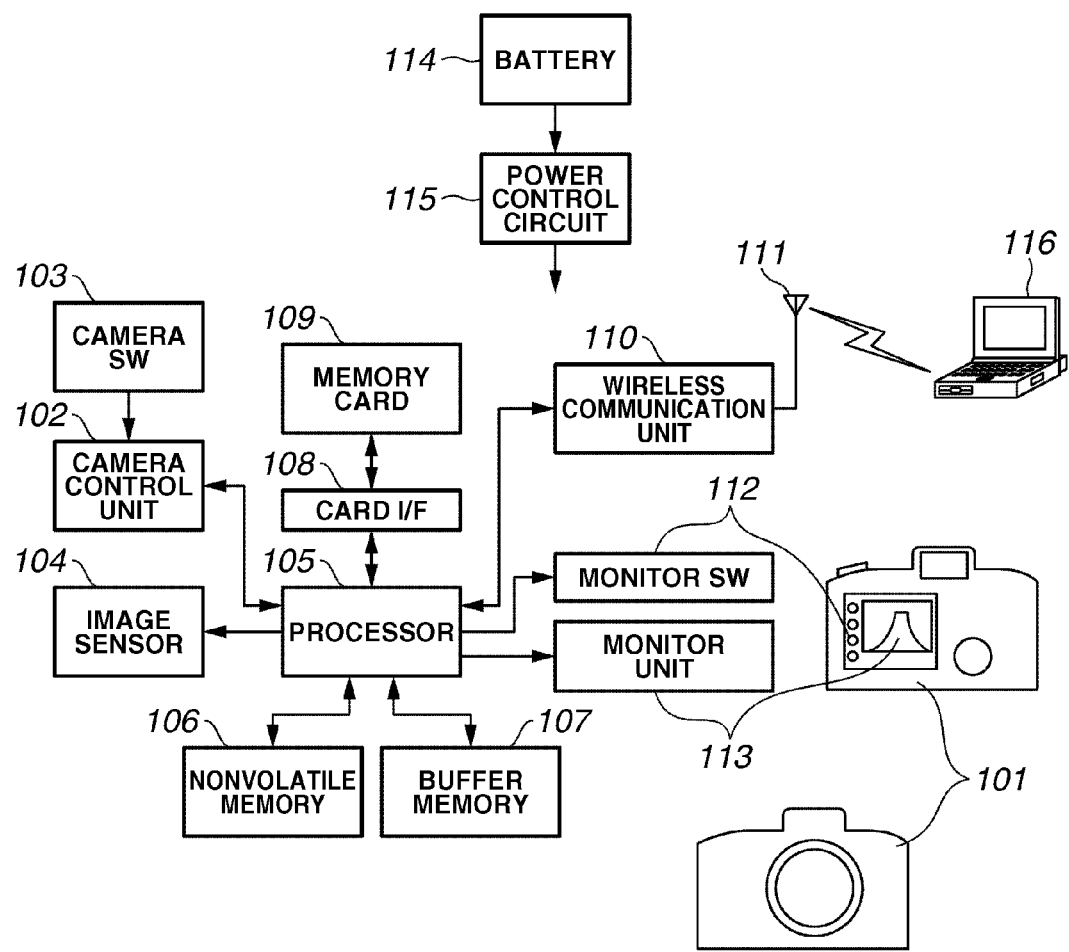
FIG. 16 illustrates a conventional camera system.

FIG. 15 is a flowchart illustrating the processing performed by the camera body part 1a to detect the state of the camera body part 1a. First, when a user turns the power source on (refer to step S1101), the front processor 5 confirms the state of the sensor 51 (refer to step S1102).

If the sensor 51 detects an electrical connection state between the signal lines 10a and 11a (YES in step S1103), the front processor 5 sets the camera body part 1a to a united mode (refer to step S1105). If the sensor 51 detects no electrical connection state (NO in step S1103), the processor 5 sets the camera body part 1a to a separated mode (refer to step S1104).

After accomplishing the mode setting operation, the front processor 5 periodically confirms the state of the sensor 51 (refer to step S1102). If there is any change in the state of the sensor 51, the front processor 5 switches the mode according to the flowchart.

Alternatively, instead of periodically executing the processing of steps S1102 through S1105, the front processor 5 can execute the processing of steps S1102 through S1105 only when the front processor 5 receives a signal indicating any change in the state from the sensor 51.

The monitor display part 1b performs the processing similar to that illustrated in FIG. 15. The rear processor 12 confirms the state of the sensor 52 and switches the mode of the monitor display part 1b based on a detected state of the sensor 52.

In the present embodiment, the "united state" represents a state where the camera body part 1a and the monitor display part 1b are operable in the united mode.

Furthermore, the "separated state" represents a state where the camera body part 1a and the monitor display part 1b are operable in the separated mode.

Figure 6:
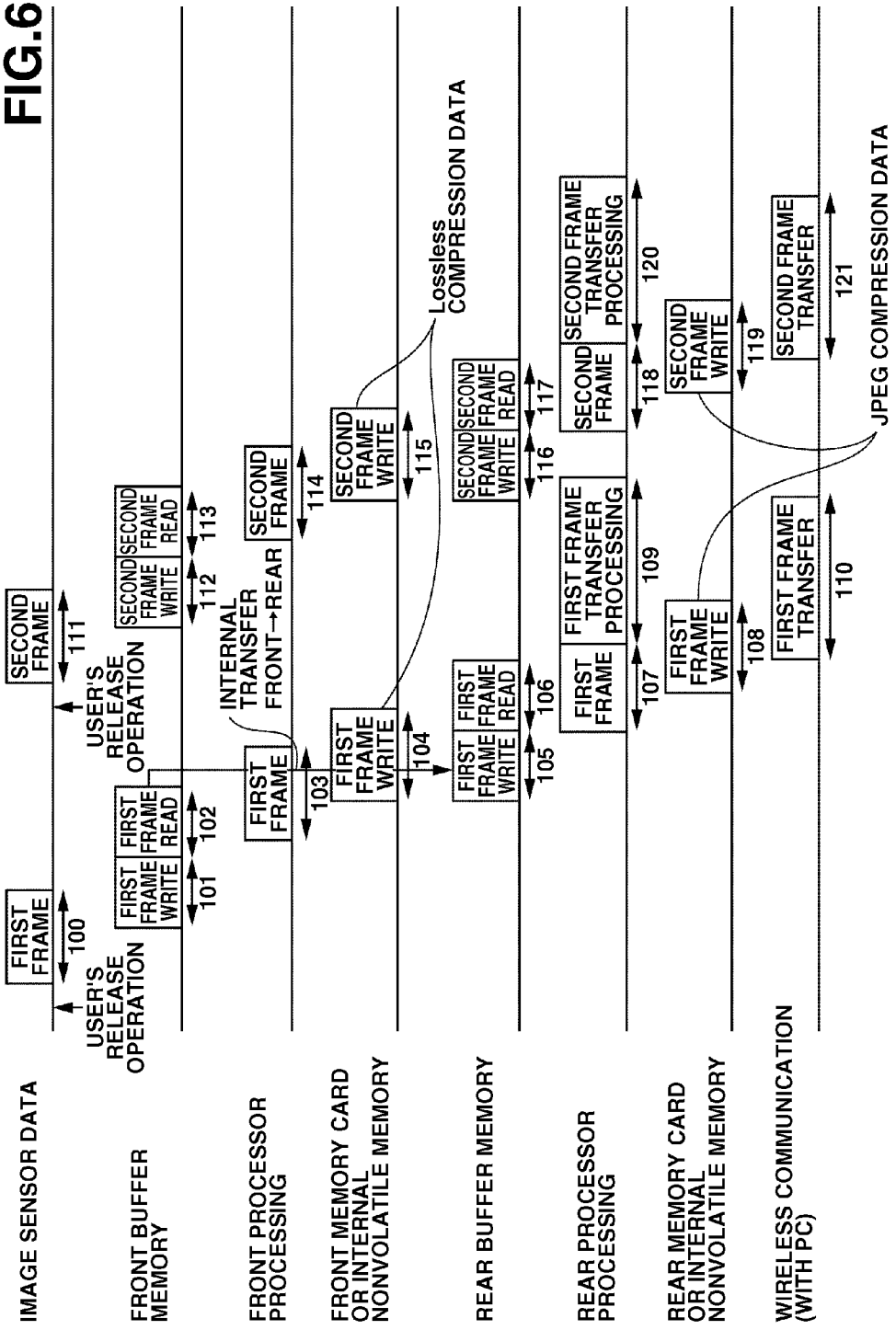
FIG. 6 is a timing chart illustrating a shooting control performed in the camera system according to the first exemplary embodiment.

The camera system according to the present embodiment performs the following sequential processing when a user integrates the camera body part 1a with the monitor display part 1b. FIG. 6 is a timing chart illustrating an exemplary shooting control performed in the camera system according to the preset embodiment.

First, in response to a user's release operation, the image sensor 4 successively reads image data of a first frame (at timing 100).

The front processor 5 receives the image data read by the image sensor and writes the received data into the front buffer memory 7 (at timing 101).

After accomplishing the writing of the image data for the first frame into the front buffer memory 7, the front processor 5 starts reading the written image data (at timing 102).

The front processor 5 applies predetermined image processing to the read data (at timing 103) and writes the processed data to the nonvolatile memory 6 or the memory card 9 (at timing 104). In the present embodiment, the predetermined image processing performed by the front processor 5 is lossless compression.

At timing 104, the front processor 5 writes the image data to the nonvolatile memory 6 or the memory card 9 and also transfers the image data to the rear processor 12 via the signal lines 10a and 11a.

When the rear processor 12 receives the image data, the rear processor 12 temporarily writes the received image data to the rear buffer memory 14 (at timing 105).

After accomplishing the writing of the image data into the rear buffer memory 14, the rear processor 12 starts reading the written image data (at timing 106).

The rear processor 12 applies image processing to the read image data (at timing 107). The front processor 5 transfers the compression image data (i.e., the lossless compression data) to the rear processor 12. Thus, the rear processor 12 applies predetermined image processing to the image data so that a user can check the image data on the monitor 20. The predetermined image processing includes JPEG compression (lossy compression) and various color processing.

After accomplishing the image processing, the rear processor 12 writes the image data to the nonvolatile memory 13 or the memory card 16 (at timing 108). The rear processor 12 can transfer the processed image data (timing 107) to the front processor 5. When the front processor 5 receives the image data from the rear processor 12, the front processor 5 writes the received image data to the memory card 9. In this case, the memory card 9 stores both the lossless compressed image data and the lossy compressed image data.

While performing the write processing, the rear processor 12 can perform processing for transferring the image data to the external PC 21. More specifically, the rear processor 12 performs protocol conversion processing for wireless communication (at timing 109), and transfers the image data via the wireless communication unit 17 to the external PC 21 (at timing 110).

As described above, the present embodiment enables a user to transfer the captured image data to the external PC 21 by simply pressing the release button under a condition where the camera body part 1a and the monitor display part 1b are united together.

When a user unites the camera body part 1a with the monitor display part 1b, the camera can flexibly use the memory card 9 and the memory card 16. Hence, the present embodiment enables a user to store the captured image data into the memory card 9 of the camera body part 1a and the memory card 16 of the monitor display part 1b by simply pressing the release button.

Thus, the camera system according to the present embodiment enables a user to record both the captured image and backup data by simply pressing the release button.

Furthermore, the camera system according to the present embodiment enables a user to record an image captured by a shooting operation on both memory cards of the camera body part 1a and the monitor display part 1b. Therefore, a user can check all captured images in both the units 1a and 1b even when the camera body part 1a and the monitor display part 1b are separately used.

Moreover, according to the camera system of the present embodiment, the front processor 5 and the rear processor 12 respectively execute variously assigned operations in the above-described sequential processing. Each processor independently executes the processing for performing an assigned role. Thus, the front processor 5 and the rear processor 12 can perform data processing in parallel. For example, the camera system according to the present embodiment can effectively process image data in a continuous shooting operation.

For example, the front processor 5 and the rear processor 12 can perform the following image processing according to independently assigned roles. The front processor 5 chiefly executes correction processing and lossless compression processing to remove defectiveness caused by the image sensor or the optical system in the camera or the combination thereof. On the other hand, the rear processor 12 applies image processing and JPEG compression (lossy compression) to the image data actually displayed on the monitor 20.

Moreover, the front processor 5 and the rear processor 12 have independently assigned roles to perform shooting processing or to transfer the image data to the external PC 21. The front processor 5 performs shooting processing (such as continuous shooting processing), while the rear processor 12 transfers the image data to the external PC 21.

For example, when the rear processor 12 transfers the image data to the external PC 21 (at timing 110), the front processor 5 can start the next shooting processing (at timing 111). A process similar to that at timing 100 to 110 is performed also at timing 112 to 121.

As described above, the front processor 5 and the rear processor 12 cooperatively perform predetermined processing according to respectively assigned roles. Thus, the present embodiment can realize effective processing for the captured image data and can greatly improve the camera performance for a shooting operation (e.g., in the image processing ability or in a burst shooting frame number).

The camera body part 1a and the monitor display part 1b can perform wireless communication for transmitting and receiving image data in a separated state, in the following manner.

Figure 2:
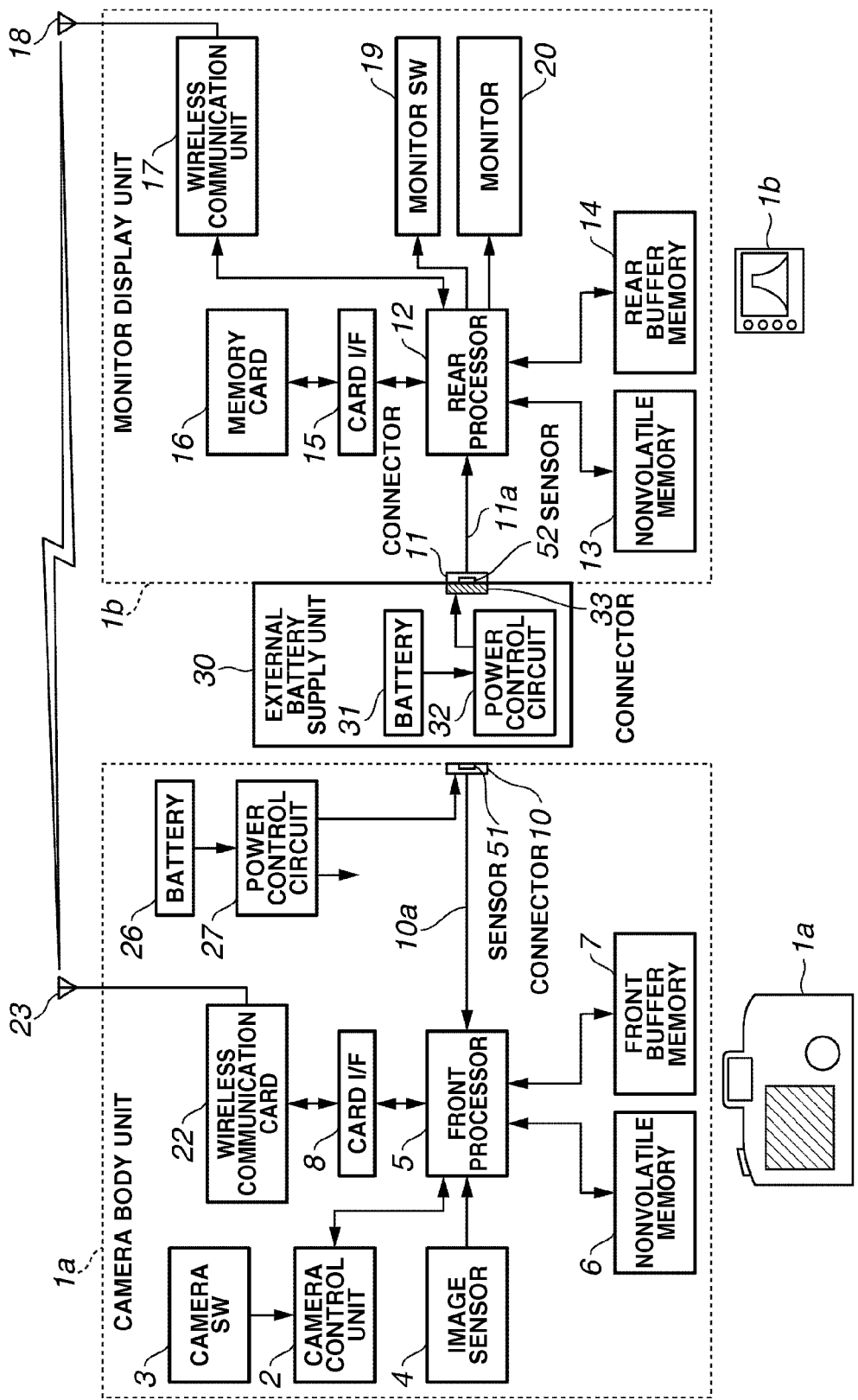
FIG. 2 is a block diagram illustrating a camera body part and a monitor display part separated from each other in the camera system according to the first exemplary embodiment.

FIG. 2 illustrates the camera body part 1a and the monitor display part 1b separated from each other in the camera system according to the present embodiment. Fundamental constituent elements or components illustrated in FIG. 2 are similar to those illustrated in FIG. 1. Hence, the following description is directed to characteristic features of the exemplary embodiment illustrated in FIG. 2 and not illustrated in FIG. 1.

The camera body part 1a according to the present embodiment has no wireless communication function. Therefore, to perform wireless communication, the camera body part 1a has the card I/F 8 to which a user can attach a wireless communication card 22. The front processor 5 can access the wireless communication card 22 via the card I/F 8.

In other words, FIG. 2 illustrates a condition where a user has replaced the memory card 9 (refer to FIG. 1) with the wireless communication card 22. The wireless communication card 22, newly attached to the camera body part 1a, has an internal arrangement similar to that of the wireless communication unit 17 (refer to FIG. 5). The wireless communication card 22 can perform transmission/reception of data to/from the wireless communication unit 17 of the monitor display part 1b via an antenna 23.

The monitor display part 1b according to the present embodiment has no built-in battery. Hence, a user can newly connect an external battery supply unit 30 to the monitor display part 1b.

In the present embodiment, the wireless communication card 22 is attached to the camera body instead of the memory card 9. However, if desirable, a camera system according to another exemplary embodiment can include the camera body part 1a having plural card interfaces so that a user can connect both the memory card 9 and the wireless communication card 22 to the front processor 5.

Figure 4:
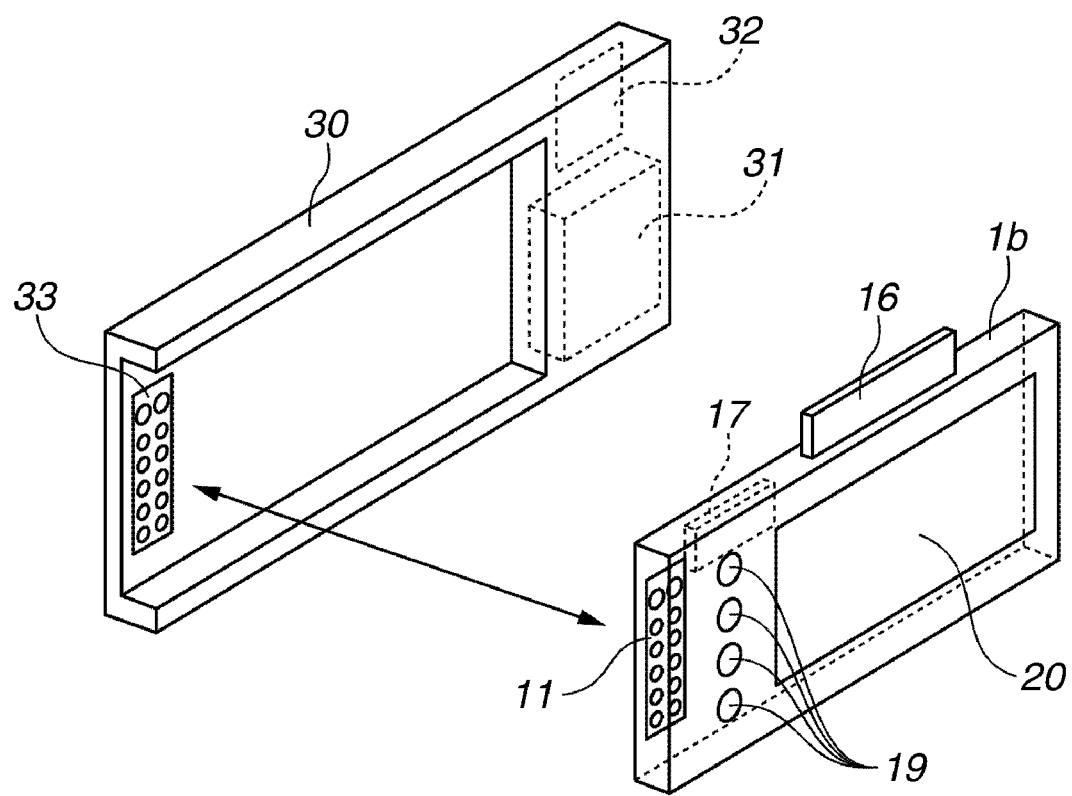
FIG. 4 is a perspective view illustrating the monitor display part connected to an external battery unit in the camera system according to the first exemplary embodiment.

FIG. 4 illustrates the external battery supply unit 30 attachable to (and also detachable from) the monitor display part 1b.

In the united state with the camera body part 1a, the connector 11 functions as a power supply source and the signal line connected to the camera body part 1a. However, a user can connect the connector 11 of the monitor display part 1b to a connector 33 dedicated to the external battery supply unit 30. The external battery supply unit 30 includes a battery 31 and a power control circuit 32. When a user connects the connector 11 of the monitor display part 1b with the connector 33 of the external battery supply unit 30, the monitor display part 1b can receive electric power from the battery 31 and a control signal from the power control circuit 32.

Figure 7:
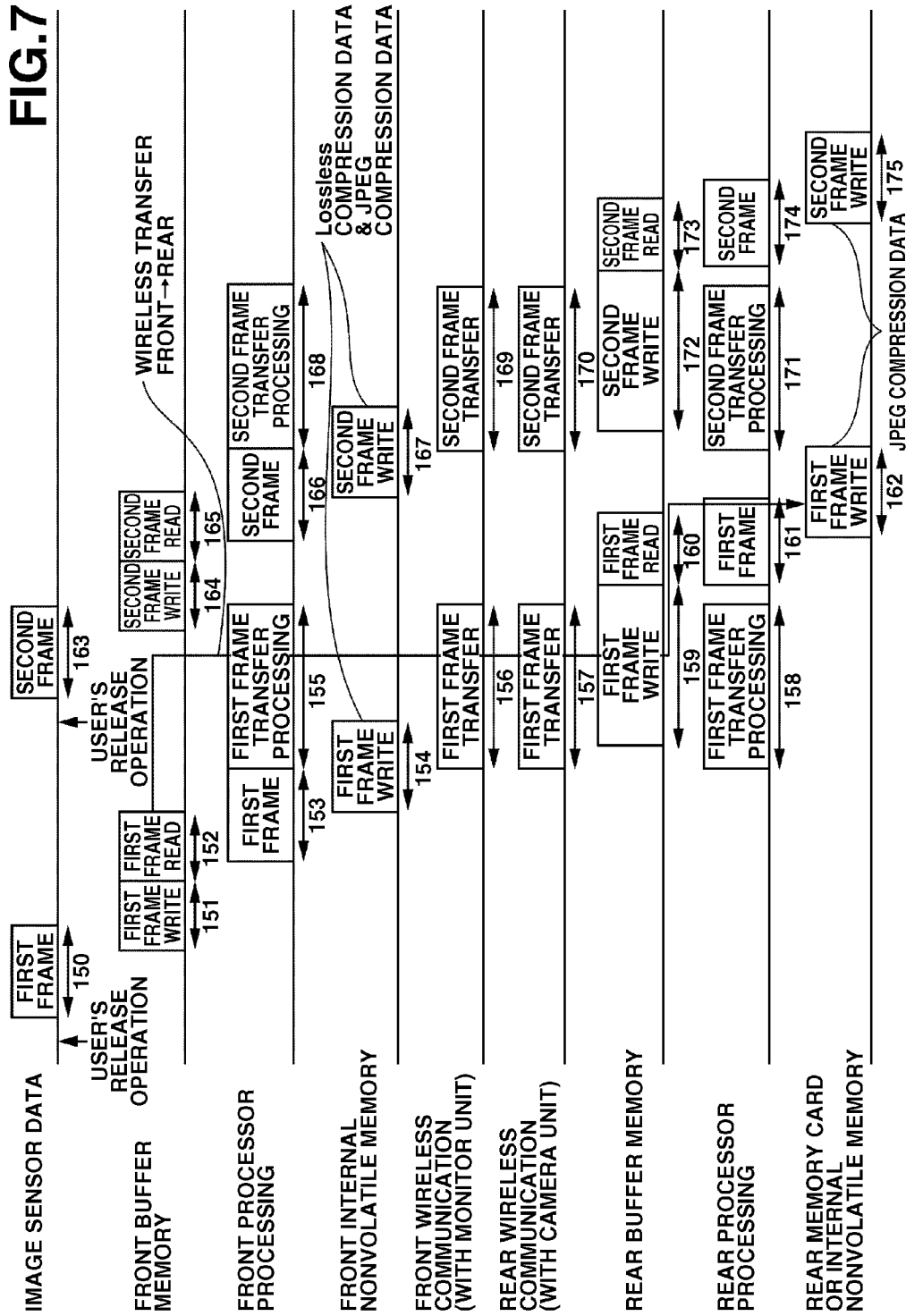
FIG. 7 is a timing chart illustrating a shooting control performed between the camera body part and the monitor display part separated from each other in the camera system according to the first exemplary embodiment.

FIG. 7 is a timing chart illustrating exemplary data transmission/reception processing performed between the camera body part 1a and the monitor display part 1b in a separated state.

First, in response to a user's release operation, the image sensor 4 successively reads image data of a first frame (at timing 150).

The front processor 5 writes the read image data to the front buffer memory 7 (at timing 151).

After accomplishing the writing of the image data for the first frame, the front processor 5 immediately starts reading the written image data (at timing 152).

The front processor 5 applies predetermined image processing to the read image data (at timing 153) and writes the processed image data to the nonvolatile memory 6 (at timing 154). In the present embodiment, the memory card 9 is detached from the camera body part 1a. Therefore, the front processor 5 stores the image data into the nonvolatile memory 6. In this case, the predetermined image processing performed by the front processor 5 is JPEG compression (lossy compression).

More specifically, in a separated state, the camera body part 1a transfers image data to the monitor display part 1b via a wireless communication medium. In this case, if the transferred data is lossless compressed data, the amount of the transferred data is large and the load in the communication becomes larger.

Hence, the front processor 5 compresses the image data based on JPEG compression technology to reduce the data amount and shorten the time required for transferring the data.

In addition to the writing processing, the front processor 5 performs protocol conversion processing to transfer image data to the monitor display part 1b via a wireless communication medium (at timing 155).

Then, the front processor 5 transfers the image data of the first frame to the monitor display part 1b via the wireless communication card 22 connected to the card I/F 8 (at timing 156).

The monitor display part 1b receives the image data transmitted from the camera body part 1a via the wireless communication unit 17 (at timing 157).

The rear processor 12 applies protocol processing to the received image data (at timing 158), and temporarily writes the received data to the rear buffer memory 14 (at timing 159).

After accomplishing the writing processing, the rear processor 12 immediately starts reading the written image data (at timing 160). The rear processor 12 performs file processing for converting the image data into a predetermined file and also performs resize processing for adjusting the image data to have a size matching a display size of the monitor 20 (at timing 161). In other words, the rear processor 12 performs the processing required for adequately displaying the captured image data.

The rear processor 12 writes the received image data to the memory card 16 (at timing 162). A process similar to that at timing 150 to 162 is performed also at timing 163 to 175.

As described above, if a user separates the monitor display part 1b from the camera body part 1a, the camera body part 1a writes captured image data to the nonvolatile memory 6 in response to a user's release operation. The camera body part 1a transfers the captured image data via a wireless communication medium to the monitor display part 1b positioned at a remote place. The monitor display part 1b receives the image data transferred from the camera body part 1*a* and writes the received image data to the nonvolatile memory 13 or the memory card 16.

With the above-described arrangement, the camera body part 1*a* can directly transfer the data to the monitor display part 1*b* positioned at a remote place.

The nonvolatile memory 6 can stably store the image data if written before being transferred to the monitor display part 1*b*. Thus, no image data is lost even if the wireless data transfer processing is unsuccessful.

According to the present embodiment, the camera body part 1*a* starts shooting processing in response to a detection signal of the camera SW 3 that can detect a user's pressing operation.

On the other hand, when the camera body 1*a* and the monitor display part 1*b* perform wireless communication as illustrated in FIG. 2, the camera system according to the present embodiment enables a user to start the shooting processing of the camera body part 1*a* by operating the monitor display part 1*b* at a remote place.

In this case, a user can operate the monitor SW 19 or a GUI displayed on the monitor 20 provided on the monitor display part 1*b*. Thus, the monitor SW 19 or the GUI displayed on the monitor 20 is equivalent to the camera SW 3 provided on the camera body 1*a*. The rear processor 12 detects a user's pressing operation on the monitor SW 19 or the monitor 20 in a condition where the camera body part 1*a* is in a release waiting state. In response to user's operation on the monitor SW 19 or on a GUI, the rear processor 12 converts the protocol of a release command and transfers the release command to the camera body part 1*a* via the wireless communication unit 17.

The wireless communication card 22 attached to the camera body part 1*a* receives the data including the release command transmitted from the monitor display part 1*b*. The front processor 5 performs protocol conversion processing for the received data. When the front processor 5 detects the release command, the front processor 5 sends a release instruction to the camera control unit 2. The camera control unit 2 performs shooting processing in response to the release instruction.

For example, in a condition where the camera body part 1*a* is fixed on a tripod, the present embodiment enables a user to instruct a release operation for the camera body part 1*a* from the monitor display part 1*b* separated from the camera body part 1*a*.

In the present embodiment, the camera body part 1*a* and the monitor display part 1*b* in a united state can store captured image data into respective memory cards 9 and 16. However, if desirable, a camera system according to another embodiment enables a user to select a memory card storing the image data.

Figure 14:
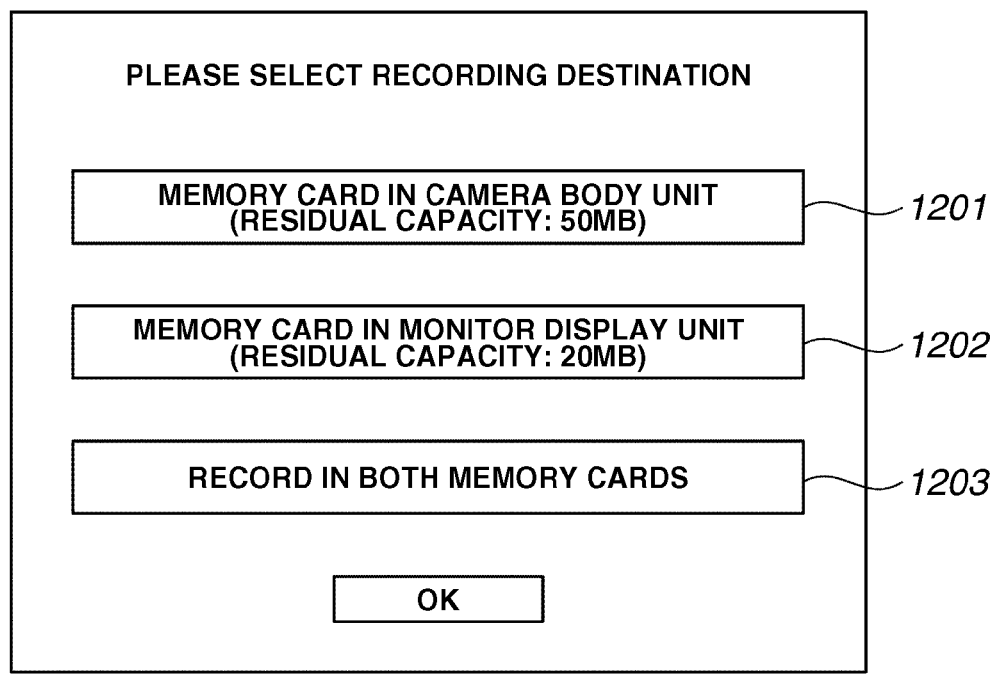
FIG. 14 illustrates a recording destination set screen used in the camera system according to the first exemplary embodiment.

FIG. 14 illustrates an exemplary GUI displayed on the monitor 20 by the rear processor 12 to let a user select a desirable memory card as a recording destination of the captured image data. When a user selects an icon 1201, the rear processor 12 determines the memory card 9 as a recording destination. When a user selects an icon 1202, the rear processor 12 determines the memory card 16 as a recording destination. When a user selects an icon 1203, the rear processor 12 determines each of the memory card 9 and the memory card 16 as a recording destination.

The exemplary GUI screen illustrated in FIG. 14 includes the display of a residual capacity for each of the memory card 9 and the memory card 16 based on detection by the front processor 5 and the rear processor 12.

As described above, if a user can arbitrarily select a desired recording destination, the user can record the image data in an intended memory card having a sufficient residual capacity.

Moreover, during the processing for transferring the image data from the memory card 16 to the external PC 21, the camera system may prohibit newly writing image data to the memory card 16. In such a case, the camera system determines the memory card 9 as a recording destination of the captured image data and enables a user to perform a shooting operation at intended timing.

A second exemplary embodiment according to the present invention is similar to the above-described first exemplary embodiment. Therefore, the following description includes only the characteristic features of the second embodiment.

Figure 8:
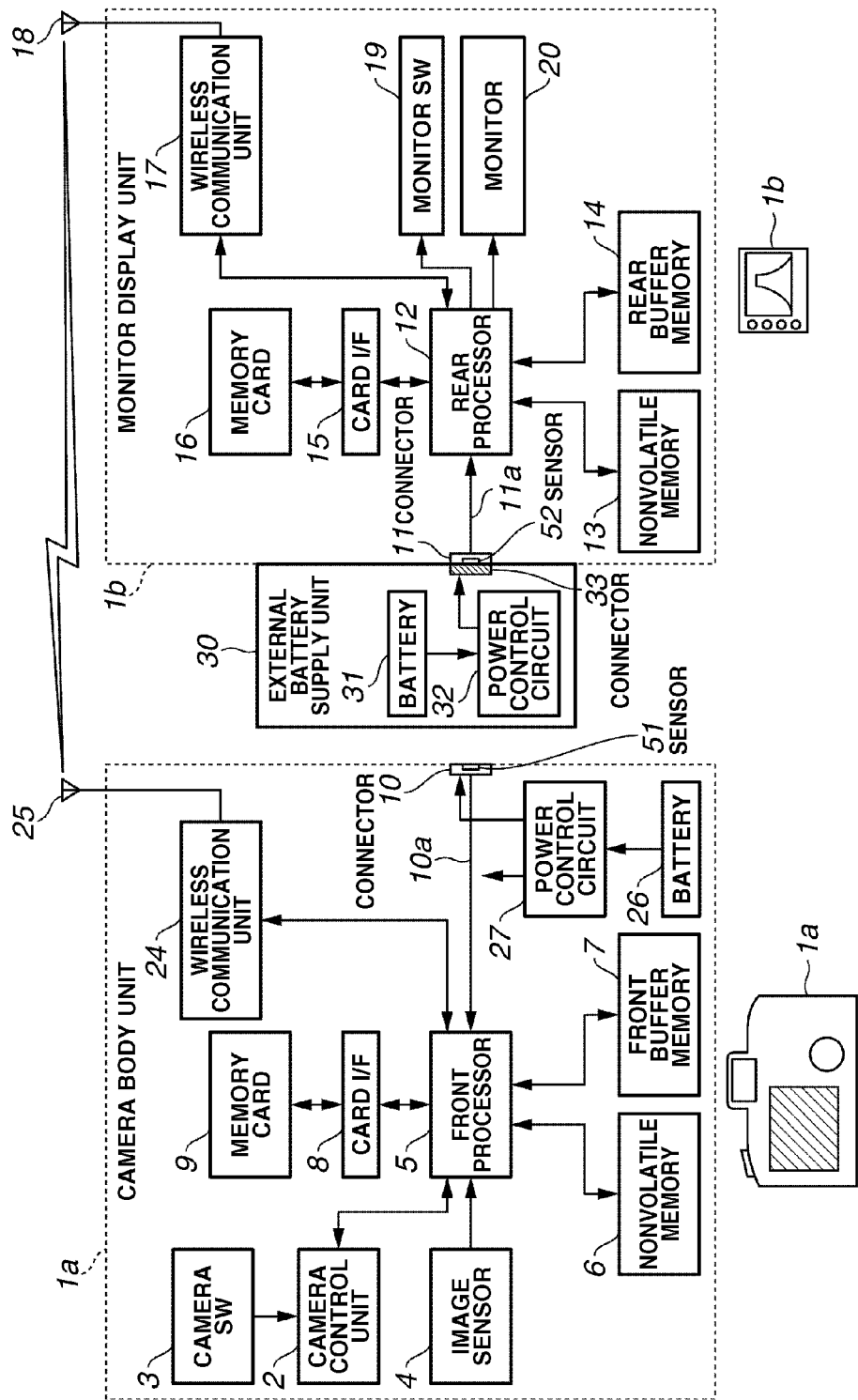
FIG. 8 is a block diagram illustrating a camera body part and a monitor display part separated from each other in a camera system according to a second exemplary embodiment.

FIG. 8 illustrates a camera system according to the present embodiment, according to which the camera body part 1*a* includes a built-in wireless communication unit 24, and the monitor display part 1*b* includes the built-in wireless communication unit 17.

The camera system according to the present embodiment is similar to the camera system according to the first exemplary embodiment in the fundamental flow of data illustrated in the arrangement of FIG. 2 and the timing chart of FIG. 7.

According to the present embodiment, the camera body part 1*a* and the monitor display part 1*b* include the built-in wireless communication units 24 and 17 dedicated to respective units. Therefore, the camera body part 1*a* and the monitor display part 1*b* can constantly use mass-storage memory cards attached to respective card I/F units 8 and 15.

Figure 9:
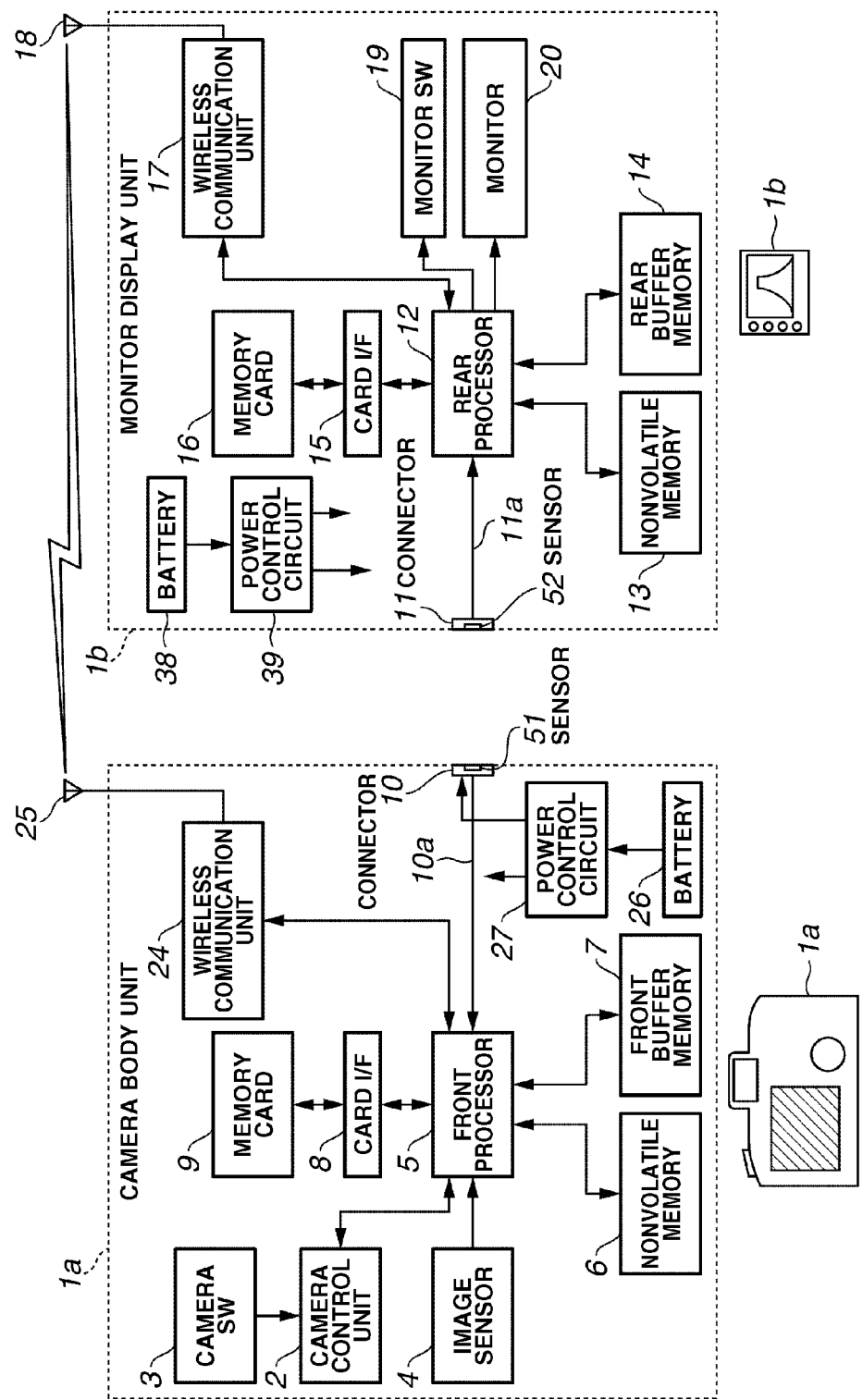
FIG. 9 is a block diagram illustrating the camera body part and the monitor display part separated from each other in the camera system according to the second exemplary embodiment.

Furthermore, as illustrated in FIG. 9, the monitor display part 1*b* can be modified to include a dedicated battery 38 and a power control circuit 39 which may be constructed from an AC/DC converter. According to the modified arrangement, the monitor display part 1*b* can receive a power voltage and a control signal from the built-in units.

According to the modified arrangement, the monitor display part 1*b* includes a built-in battery 38. Thus, the camera system requires no optional member such as a battery supply unit 30 in a separated state of the camera body part 1*a* and the monitor display part 1*b*.

The above-described processing in a separated state according to the first exemplary embodiment includes the processing for successively transferring the image data from the camera body part 1*a* via a wireless communication medium to the monitor display part 1*b*.

In general, the wireless communication is useful to transfer image data. However, compared to a cable communication, the wireless communication is slow in transfer speed (or rate) and accordingly takes a longer time to transfer the image data from the camera body part 1*a* to the monitor display part 1*b*.

Hence, the third exemplary embodiment according to present invention includes the monitor display part 1*b* capable of selecting desired image data stored in the camera body part 1*a* and obtaining the selected image data.

Furthermore, the present embodiment can effectively perform image processing using two processors, i.e., the front processor 5 and the rear processor 12, when the camera system performs a continuous shooting control with the camera body part 1*a* and the monitor display part 1*b* in a united state.

The camera system according to present embodiment performs the following processing. The present embodiment is similar to the above-described exemplary embodiments in fundamental arrangement. Hence, the following description is directed to characteristic features of the present embodiment.

When the camera body part 1*a* and the monitor display part 1*b* are united together, the camera system according to the present embodiment performs the following processing.

Figure 10:
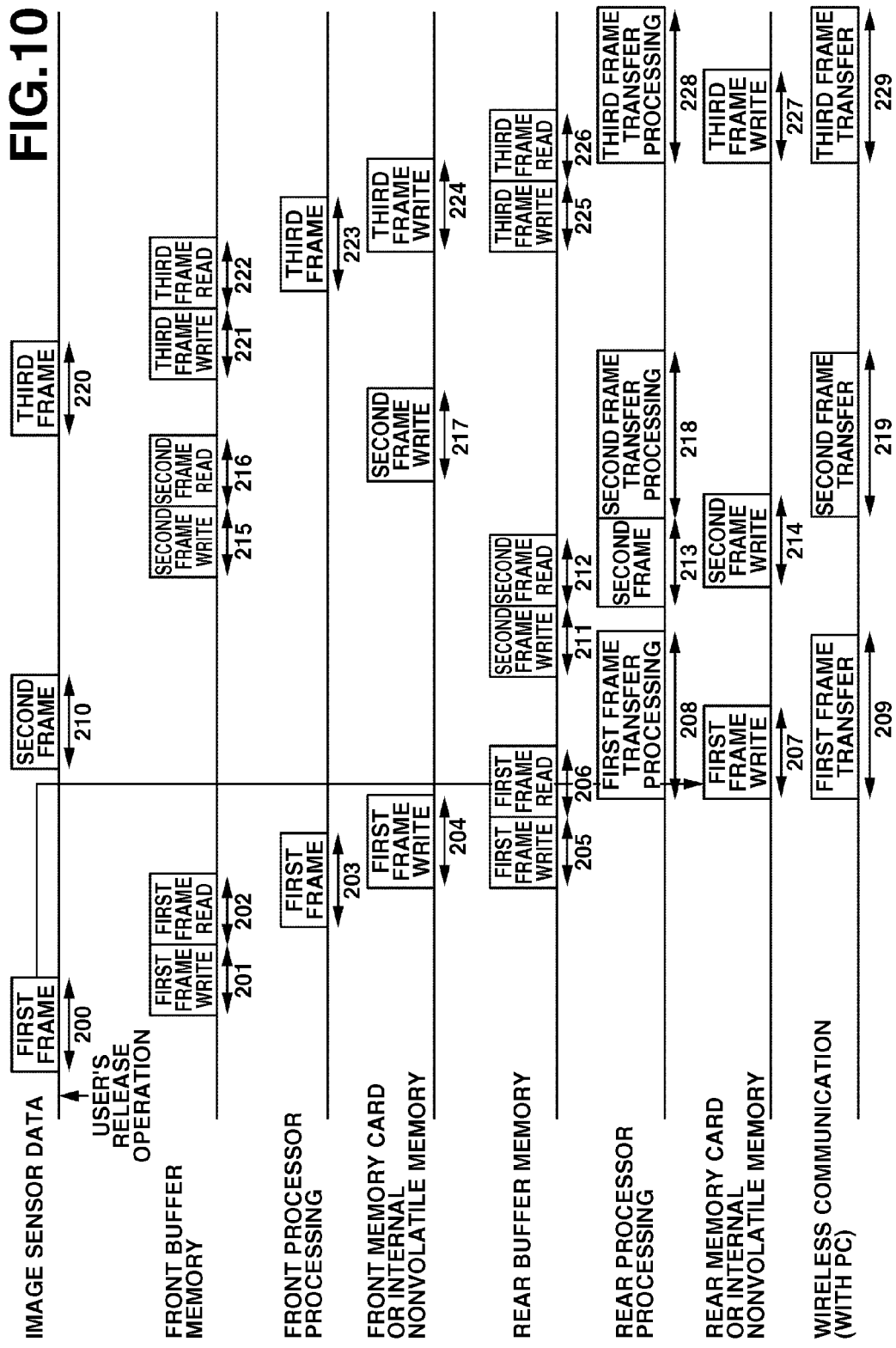
FIG. 10 is a timing chart illustrating a shooting control performed between a camera body part and a monitor display part separated from each other in a camera system according to a third exemplary embodiment.

FIG. 10 is a timing chart illustrating exemplary processing for a shooting control performed between the camera body part 1*a* and the monitor display part 1*b* in a united state according to the present embodiment.

First, in response to a user's release operation, the image sensor 4 successively reads image data of a first frame (at timing 200). The front processor 5 writes the read image data to the front buffer memory 7 (at timing 201). After accomplishing the writing of the image data for the first frame, the front processor 5 immediately starts reading the written image data (at timing 202).

The front processor 5 applies predetermined image processing to the read data (at timing 203). In this case, the image processing performed by the front processor 5 is JPEG compression (lossy compression) and image processing for finalizing the image data for the display.

Then, the front processor 5 writes the processed data to the nonvolatile memory 6 or the memory card 9 (at timing 204). Meanwhile, the front processor 5 transfers the data to the rear processor 12 via the signal lines 10*a* and 10*b*. The rear processor 12 receives the image data transferred from the front processor 5 and temporarily writes the data to the rear buffer memory 14 (at timing 205).

After accomplishing the writing of the image data to the rear buffer memory 14, the rear processor 12 immediately starts reading the written data (at timing 206). The rear processor 12 writes the read data to the nonvolatile memory 13 or the memory card 16 (at timing 207). Meanwhile, the rear processor 12 transfers the image data to the external PC 21 via a wireless communication medium. The rear processor 12 performs protocol conversion processing for wireless communication (at timing 208), and transfers the image data to the external PC 21 via the wireless communication unit 17 (at timing 209).

The camera system according to the present embodiment performs the following processing in response to a shooting operation of a second frame. Similar to the processing for first frame, the image sensor 4 successively reads image data for the second frame (at timing 210). However, in contrast to the first frame, the front processor 5 applies no image processing to the image data of the second frame and directly transfers the captured image data to the rear processor 12. The rear processor 12 receives the image data transferred from the front processor 5 and writes the received data to the rear buffer memory 14 (at timing 211).

After accomplishing the writing of the image data for the second frame, the rear processor 12 immediately starts reading the written image data (at timing 212). Then, the rear processor 12 applies image processing to the image data (at timing 213). In this case, the image processing performed by the rear processor 12 is JPEG compression (lossy compression) and image processing for finalizing the image data for the display.

The rear processor 12 writes the processed data to the nonvolatile memory 13 or the memory card 16 (at timing 214). In addition to the write processing, the rear processor 12 transfers the processed image data to the front processor 5 via the signal lines 10*a* and 10*b*.

The front processor 5 temporarily writes the received image data to the front buffer memory 7 (at timing 215). After accomplishing the writing of the image data, the front processor 5 immediately starts reading the written image data (at timing 216). The front processor 5 writes the read data to the nonvolatile memory 6 or the memory card 9 (at timing 217).

After accomplishing the processing for transferring the image data to the front processor 5, the rear processor 12 performs a wireless communication for transferring the image data to the external PC 21. The rear processor 12 performs protocol conversion processing for the wireless communication (at timing 218), and transfers the image data to the external PC 21 via the wireless communication unit 17 (at timing 219).

Furthermore, when a user performs a shooting operation for a third frame, the camera system performs the processing similar to that for the first frame. Namely, the front processor 5 performs the image processing (at respective timings 220~229). In the same manner, the front processor 5 and the rear processor 12 alternately perform the image processing during a continuous shooting operation.

As described above, the front processor 5 and the rear processor 12 according to the present embodiment can execute the assigned roles for various processing. For example, the front processor 5 executes image processing for an odd-number frame, while the rear processor 12 executes image processing for an even-number frame. This arrangement can effectively process two consecutive image data with different processors.

More specifically, the present embodiment realizes effective processing for a continuous shooting operation because the present embodiment can execute the image processing for two consecutive frames in parallel.

If desirable, a camera system according to an exemplary embodiment can include the front processor 5 that executes image processing for an even-number frame and the rear processor 12 that executes image processing for an odd-number frame.

Furthermore, a camera system according to another exemplary embodiment can include the front processor 5 that performs image processing for plural consecutive image data and the rear processor 12 that performs image processing for the rest of the image data.

In the present embodiment, the camera body part 1*a* and the monitor display part 1*b* in a separated state performs the following operation.

Figure 11:
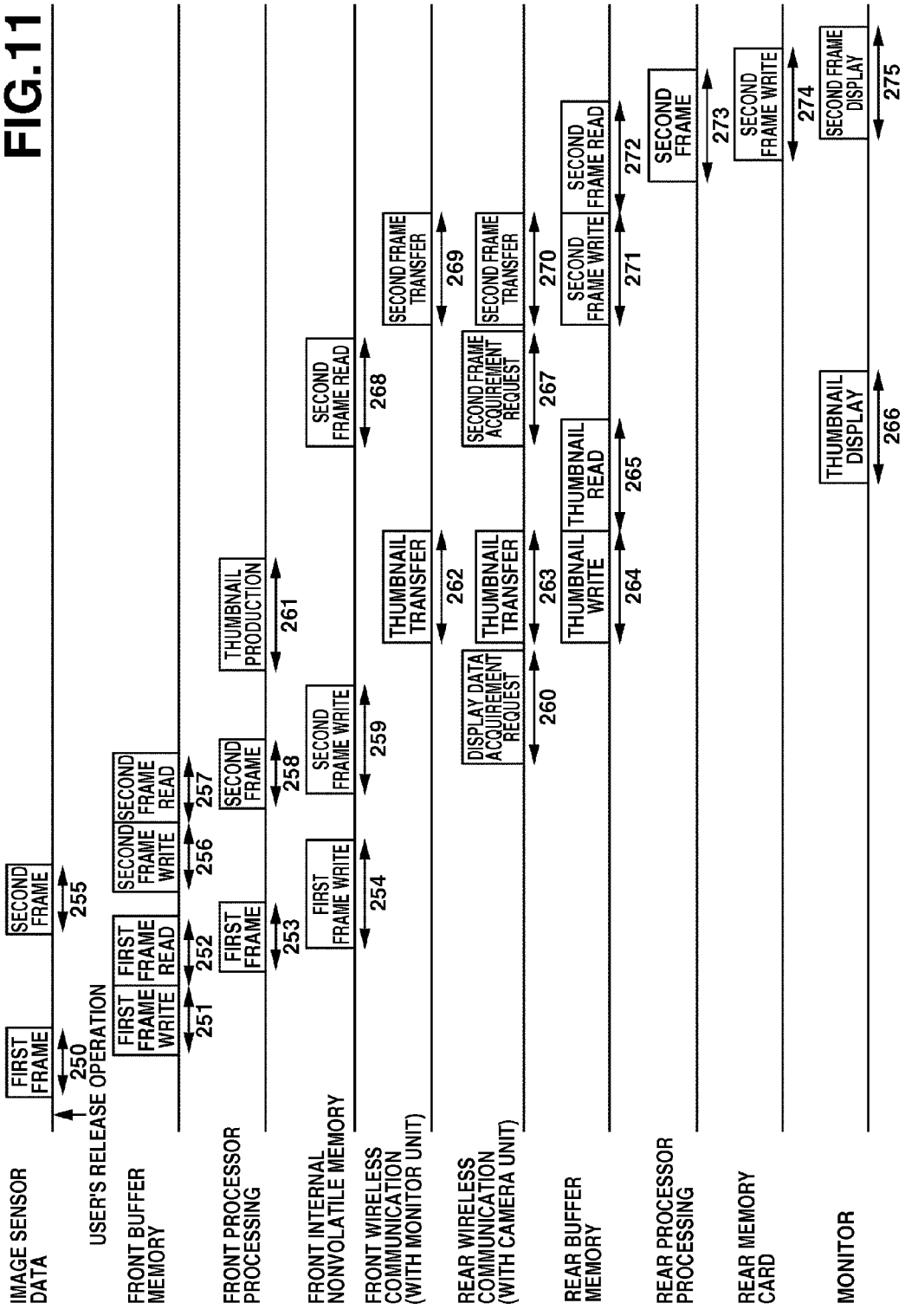
FIG. 11 is a timing chart illustrating a shooting control performed between the camera body part and the monitor display part separated from each other in the camera system according to the third exemplary embodiment.

FIG. 11 is a timing chart illustrating exemplary shooting control performed between the camera body part 1*a* and the monitor display part 1*b* in a separated state in the camera system according to the present embodiment.

In FIG. 11, in response to a user's release operation, the image sensor 4 successively reads image data for a first frame (at timing 250).

Then, the front processor 5 writes the read image data to the front buffer memory 7 (at timing 251).

After accomplishing the writing of the image data into the front buffer memory 7, the front processor 5 immediately starts reading the written image data (at timing 252).

The front processor 5 applies image processing to the read image data (at timing 253) and writes the processed image data to the nonvolatile memory 6 (at timing 254). If both the memory card 9 and the wireless communication card 22 are available, the front processor 5 can write the image data to the memory card 9. The image processing performed by the front processor 5 in this case is JPEG compression (lossy compression) and image processing for finalizing the image data for the display.

In the case of a continuous shooting operation, the front processor 5 performs similar processing for the second (at respective timings 255~259) and for succeeding frames. The front processor 5 successively writes the image data to the nonvolatile memory 6 in the camera body part 1*a*. In a separated state, the front processor 5 does not transfer the data to the monitor display part 1b during a shooting operation.

According to the present embodiment, the monitor display part 1b can obtain the image data from the camera body part 1a at appropriate timing. The operation performed by the monitor display part 1b is independent of the operation performed by the camera body part 1a. More specifically, the monitor display part 1b obtains the image data from the camera body part 1a in the following manner.

A user operating the monitor display part 1b or another operator can instruct, through the monitor SW 19 or a GUI displayed on the monitor 20, the display of image data stored in the nonvolatile memory 6 of the camera body part 1a.

When a user inputs an instruction, the rear processor 12 transmits a display-data acquirement request to the camera body part 1a (at timing 260).

When the camera body part 1a receives a display-data acquirement request from the monitor display part 1b, the front processor 5 performs communication protocol conversion processing for thumbnail data and identification information (ID) of the image data stored in the nonvolatile memory 6. Then, the front processor 5 transfers the data (i.e., thumbnail data and ID) to the monitor display part 1b (at timing 262).

The front processor 5 can produce the thumbnail data beforehand at the timing 254 in parallel with the image processing. Alternatively, the front processor 5 can produce the thumbnail data after receiving the display-data acquirement request (at timing 261). If the front processor 5 produces the thumbnail data beforehand, the front processor 5 can omit the processing at timing 261.

When the rear processor 12 receives the thumbnail data from the camera body part 1a (at timing 263), the rear processor 12 stores the thumbnail data into the rear buffer memory 14 (at timing 264).

After accomplishing the write processing, the rear processor 12 reads the thumbnail data from the rear buffer memory 14 (at timing 265) and displays the thumbnail data on the monitor 20 (at timing 266). The display pattern on the monitor 20 is a one-screen display that displays only one thumbnail data and enables a user to select desired thumbnail data or a multi-image display that displays plural thumbnail data at the same time.

A user can select desired data from the thumbnail data displayed on the monitor 20. For example, a user may select the image data of a second frame. In response to a user's selection, the rear processor 12 reads the ID of the selected thumbnail data and requests the camera body part 1a to transfer the image data corresponding to the read ID to the monitor display part 1b (at timing 267). If necessary, the rear processor 12 can request the image data of one or more frames in addition to the image data of the second frame.

When the front processor 5 of the camera body part 1a receives a transfer request, the front processor 5 reads the image data designated by the transfer request from the nonvolatile memory 6 (at timing 268).

Then, the front processor 5 performs protocol conversion processing for the wireless communication and transfers the image data to the monitor display part 1b via the wireless communication card 22 connected to the card I/F 8 (at timing 269).

The monitor display part 1b receives the data transmitted from the camera body part 1a via the wireless communication unit 17 (at timing 270).

The rear processor 12 store the received data into the rear buffer memory 14 (at timing 271).

After accomplishing the write processing, the rear processor 12 immediately starts reading the written image data (at timing 272).

Then, the rear processor 12 performs file system management processing (at timing 273) and writes the processed result to the nonvolatile memory 13 or the memory card 16 (at timing 274).

Furthermore, the rear processor 12 causes the monitor 20 to display the received image data (at timing 275).

The front processor 5 can delete the image data, if once transferred to the monitor display part 1b, from the nonvolatile memory 6. More specifically, after accomplishing the writing of the received image into the nonvolatile memory 13 or the memory card 16, the rear processor 12 transmits the ID of received image data and a write completion notice associating with each other to the camera body part 1a.

When the front processor 5 receives a write completion notice, the front processor 5 deletes the image data corresponding to the designated ID from the nonvolatile memory 6. In this case, the ID may include a file name that can specify a group of image data.

The above-described deletion processing is effective when the nonvolatile memory 6 has an insufficient capacity compared to the memory cards 9 and 16. The front processor 5 can delete unnecessary data upon confirming storage of image data into a mass-storage memory card after successful wireless transfer of intended image data. Thus, the front processor 5 can effectively use the capacity of the nonvolatile memory 6.

As described above, according to the present embodiment, the camera body part 1a stores image data if the camera body part 1a and the monitor display part 1b are in a separated state. If necessary, the monitor display part 1b can request the camera body part 1a to transfer intended image data.

Moreover, the monitor display part 1b can perform a wireless transfer for obtaining the necessary image data. Thus, the amount of transferred data is relatively small.

Furthermore, the present embodiment enables a user to select an image stored in the camera body part 1a at appropriate timing and transfers the selected image to the nonvolatile memory 13 of the monitor display part 1b.

A camera system according to a fourth exemplary embodiment performs the following processing. The fourth exemplary embodiment is similar to the above-described exemplary embodiments in fundamental arrangement. Hence, the following description is directed to characteristic features of the fourth exemplary embodiment.

Figure 12:
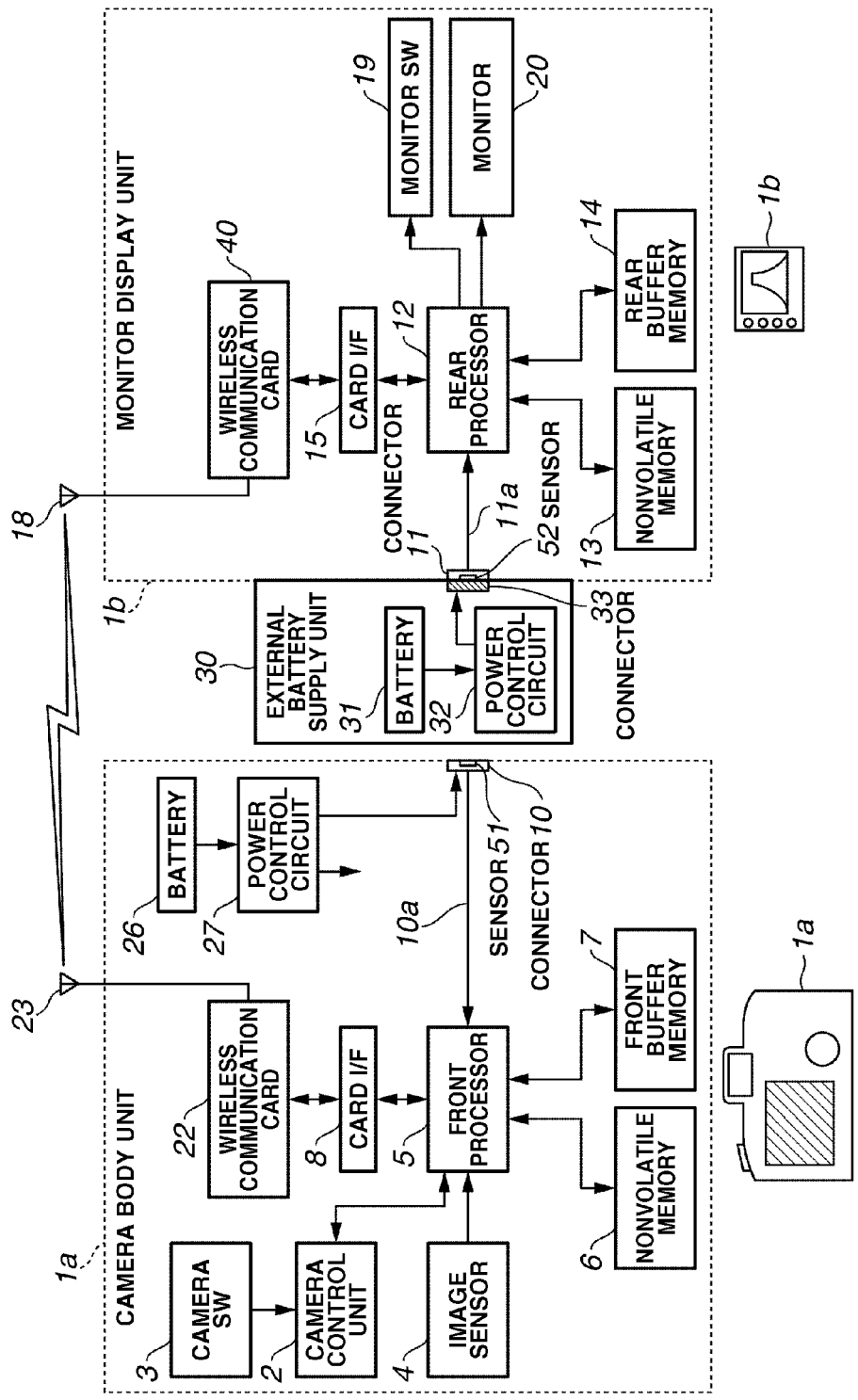
FIG. 12 is a block diagram illustrating a camera body part and a monitor display part separated from each other in a camera system according to a fourth exemplary embodiment.

FIG. 12 is a block diagram illustrating a camera system according to the present embodiment. According to the arrangement of the camera system illustrated in FIG. 12, the camera body part 1a does not include a built-in wireless communication unit, and the monitor display part 1b does not include a built-in wireless communication unit.

In this case, the camera body part 1a is connected via the card I/F 8 to the wireless communication card 22. The monitor display part 1b is connected via the card I/F 15 to the wireless communication card 40. The camera system according to the present embodiment can realize the above-described wireless image transfer processing with the wireless communication cards 22 and 40.

According to the system arrangement illustrated in FIG. 12, a user can insert a card type communication device into a slot of the card I/F 8 and the card I/F 15 only when the user performs a shooting operation with the camera body part 1a and the monitor display part 1b in a separated condition.

In this case, the camera body part 1a stores captured image data into the nonvolatile memory 6, and the monitor display part 1b stores the captured image data into the nonvolatile memory 13.

According to the above-described arrangement, a user can use detachable communication devices only when the camera body part 1a and the monitor display part 1b are in a separated condition. Thus, the present embodiment can decrease the body size of a camera and costs for the camera.

Moreover, the camera body part 1a and the monitor display part 1b includes the nonvolatile memories 6 and 13 that can store the image data when the communication devices are connected to the card I/F 8 and the card I/F 15.

Figure 13:
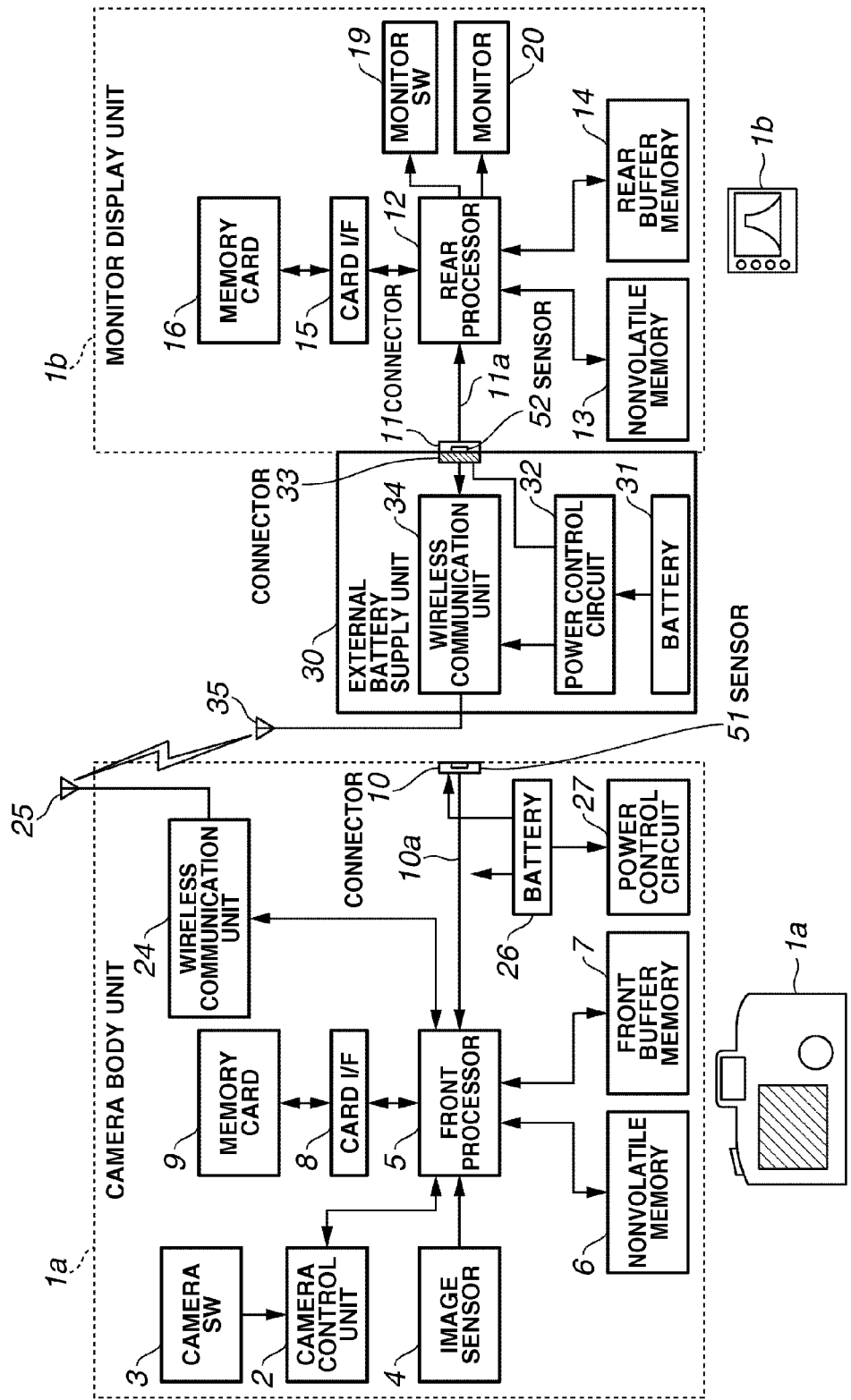
FIG. 13 is a block diagram illustrating the camera body part and the monitor display part separated from each other in a camera system according to the fourth exemplary embodiment.

FIG. 13 illustrates a modified embodiment comparable to the embodiments illustrated in FIGS. 8 and 9. The modified embodiment illustrated in FIG. 13 includes a wireless communication unit 34 and an external antenna 35 provided in the external battery supply unit 30 that is capable of supplying electric power to the monitor display part 1b in a case where the monitor display part 1b is separated from the camera body part 1a.

The monitor display part 1b does not include a built-in wireless communication unit. The monitor display part 1b, when united with the camera body part 1a, can communicate with the external PC 21 via the built-in wireless communication unit 24 of the camera body part 1a. The monitor display part 1b, when separated from the camera body part 1a, can transmit/receive image data to/from the camera body part 1a with the wireless communication unit 34 of the external battery supply unit 30.

As the external battery supply unit 30 includes the wireless communication unit 34, a user can exclusively use the card I/F 15 of the monitor display part 1b for the memory card 16. Furthermore, a user can be free from a complicated procedure for independently connecting a wireless communication device and an external battery to the monitor display part 1b.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer with a storage (or recording) medium storing the program code.

In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses WWW servers that allow numerous users to download the program files so that the functions or processes of the present invention can be realized on their computers.

Next, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-136419 filed May 16, 2006, which is hereby incorporated by reference herein in its entirety.

What is claimed is:

1. An imaging apparatus that has a first part and a second part separable from the first part, the imaging apparatus comprising:
   a transmission control unit configured to control transmission of image data from the first part to the second part by wireless communication;
   a capturing unit capable of capturing an image in the first part; and
   a display unit capable of displaying an image data in the second part,
   wherein the imaging apparatus, if the image capturing is performed by the capturing unit in a united state, is able to store image data of the captured image in a nonvolatile storage medium of the first part and a nonvolatile storage medium of the second part, and to display the image data of the captured image on the display unit on the second part, and
   wherein the imaging apparatus, if the image capturing is performed by the capturing unit in a separated state, stores image data of the captured image in the storage medium of the first part and transmits the image data to the second part by wireless communication such that the image data of the captured image is capable of being displayed on the display unit of the second part.

2. The imaging apparatus according to claim 1, further comprising a selection unit configured to select at least one of the nonvolatile storage medium of the first part and the nonvolatile storage medium of the second part as a storage destination, wherein if the image capturing is performed by the capturing unit in the united state the imaging apparatus stores the image data of the captured image in the nonvolatile storage medium selected by the selection unit.

3. The imaging apparatus according to claim 1, further comprising an interface unit configured to be selectively connected to a memory card storing the image data or a communication card capable of transmitting the image data to an external device, wherein if the image capturing is performed by the capturing unit in the united state, the imaging apparatus stores the image data of the captured image onto the memory card connected to the interface unit, and wherein if the image capturing is performed by the capturing unit in the separated state, the transmission control unit transmits the image data of the captured image from the first part to the second part with the communication card connected to the interface unit.

4. The imaging apparatus according to claim 3, wherein the first part includes a nonvolatile memory different from the memory card, wherein if the image capturing is performed by the capturing unit in the separated state, the imaging apparatus stores the image data of the captured image into the nonvolatile memory.

5. The imaging apparatus according to claim 4, wherein the first part further comprises a deletion unit configured to delete the image data of the captured image from the nonvolatile memory after the transmission control unit transmits the image data from the first part to the second part.

6. The imaging apparatus according to claim 1, wherein the second part further comprises a request unit configured to request the first part to transfer the image data of the captured image in the separated state, wherein the transmission control unit transmits the image data of the captured image from the first part to the second part in response to a request generated from the request unit.

7. The imaging apparatus according to claim 6, wherein the second part further comprises an image selection unit configured to select image data requested by the request unit.

8. The imaging apparatus according to claim 7, wherein the display unit of the second part displays a screen receiving selection of image data by the selection unit.

9. The imaging apparatus according to claim 1, further comprising an instruction transmission unit configured to transmit an instruction of a shooting operation from the second part to the first part in the separated state.

10. A method for controlling an imaging apparatus that has a first part and a second part separable from the first part, the method comprising:

transmitting of the image data from the first part to the second part by wireless communication;

capturing an image in the first part; and displaying an image data in the second part, wherein if the image capturing is performed in a united state, storing image data of the captured image in a nonvolatile storage medium of the first part and a nonvolatile storage medium of the second part, and to display the image data on the captured image on the display unit of the second part, and wherein if the image capturing is performed in a separated state, storing image data of the captured image in the storage medium of the first part and transmitting the image data to the second part by wireless communication such that the image data of the captured image is capable of being displayed on the display unit of the second part.

11. A computer-readable storage medium storing computer-executable process steps, the computer-executable process steps causing a computer to execute the method of claim 10.

* * * * *